United States Patent [19]

Kitaoka

[11] Patent Number: 5,479,237
[45] Date of Patent: Dec. 26, 1995

[54] CAMERA HAVING INFORMATION SETTING APPARATUS

[76] Inventor: Naoki Kitaoka, 2-8, Ohjidai, 4-chome, Sakura City, Chiba, Japan

[21] Appl. No.: 207,343

[22] Filed: Mar. 8, 1994

[30] Foreign Application Priority Data

Mar. 12, 1993 [JP] Japan .................................. 5-052355

[51] Int. Cl.$^6$ .................................................. G03B 17/18
[52] U.S. Cl. ...................................... 354/474; 354/289.12
[58] Field of Search .................................... 354/474, 475, 354/445, 470, 289.1, 289.11, 289.12

[56] References Cited

U.S. PATENT DOCUMENTS 4,890,134  12/1989  Fujino et al. ............................ 354/442

FOREIGN PATENT DOCUMENTS 62-144147  6/1987  Japan .
2-137830   5/1990  Japan .

Primary Examiner—Michael L. Gellner
Assistant Examiner—Eric Nelson

[57] ABSTRACT

A camera having an information setting apparatus which sets information such as the shutter speed, the aperture value, and the ISO speed of the film, and its purpose is to be able to quickly and accurately perform a manual setting of the information value desired by a photographer to an automatically set information value or to the proximity of the information value. The camera information setting apparatus has a detection unit which detects the external information used during picture taking, an automatic setting unit which automatically sets information related to picture taking based on external information, and a manual setting unit which can be externally controlled and which sets information related to picture taking through manual control. The camera information setting apparatus is also equipped with a comparator which compares the information set by the automatic setting unit and the information set by the manual setting unit and a modification unit which modifies the variation in information settings with respect to the control input to the manual setting unit based on the results of the comparison by the comparator.

8 Claims, 5 Drawing Sheets

CAMERA HAVING INFORMATION SETTING APPARATUS

BACKGROUND OF THE INVENTION

1. Field of the Invention

The present invention relates to cameras, and more particularly, to a camera having an apparatus which is capable of setting various types of information, such as the shutter speed, the aperture value, and the ISO speed of the film, in order to take a photograph. Such a camera has the ability to automatically determine an optimum value of the particular type of information and the user taking the photograph may manually adjust a setting on the camera to a desired value, including the optimum value determined by the camera.

2. Description of the Related Art

Presently, there are cameras which have the capability of automatically determining an optimum value for various types of information for the camera, such as the shutter speed, the aperture value, and the ISO speed of the film. An automatic setting unit, such as an exposure meter or the camera CPU, determines the optimum value. In addition, a user may manually adjust the set information values relating to these types of information as desired. Different devices for manually setting information for the camera, such as the above-mentioned shutter speed, the aperture value, and the ISO speed of the film, are well known. For instance, one such device uses a dial system with a built-in board onto which surface information values are written and onto which a slidable resistor, or a 4-bit or 5-bit code value, is patterned. The dial system, positioning a click at each specified angle on an endless-type dial, increases the set information value by a given increment for each angle of rotation of the dial in a fixed direction and reduces the set information value by an equal given increment for each angle of rotation of the dial in the opposite direction. This device is disclosed in Japanese Patent Publication No. 58-63923. Also known is a 2-switch system, equipped with an up switch and a down switch, that increases the set information value by a given increment each time the up switch is pressed down, and reduces the set information value by the given increment each time the down switch is pressed down.

However, in these types of cameras, for example, during so-called manual exposure photography, in which the photographer adjusts the set information value with respect to the camera's photometric value by hand, modification of the manually set value using an information setting member when the photographer manually adjusts the set value to the optimum value can only be performed in a fixed stipulated ratio with respect to the control input, even if the present manually set value is very far from or very near to the optimum value.

In other words, for each given amount of movement by the information setting member, whether it be a given number of degrees of rotation of the information setting member or a depression of the same, the present manually set value of the information is changed by a given fixed increment no matter how far or near this presently set information value is to the optimum value (as determined by the automatic setting unit).

For this reason, when the presently set information value is very far from the optimum value, in order for the photographer to manually set the information to the optimum value, he or she has to perform a large number of control member operations, and even if the presently set information value is extremely close to the optimum value, in the case where the optimum value is in a range which is more narrow than the given fixed increment, the setting of the information could only be performed at the given fixed increment with respect to the control input of the control member, even if the photographer has modified the set information, so that there is a drawback in that the information cannot be set to the optimum value.

Therefore, in order to overcome such problems, conventionally known information setting devices for solving these types of problems are, for example, presented in Japanese Patent Publication No. 62-144147. This publication discloses a device which makes it possible for the photographer to select the incremental change of the information variation to the control input of the information setting member. Also, as described in Japanese Patent Publication No. 2-137830, there is a device in which the number of button-type information setting members is increased and the number of information variations per control is increased.

However, when information is set by these conventional setting devices, problems arise such as the tact that there is a danger of increasing the operations which change the increments of the variation in information to the control input of the control member and, therefore, the photographer may miss a shutter chance during modification of the settings, and also, when selecting the increment of the variation in information, the number of buttons may increase, thereby making control of the camera more complicated.

SUMMARY OF THE INVENTION

Accordingly, it is an object of the present invention to solve problems associated with such conventional cameras.

It is a further object of the present invention to provide a camera information setting apparatus wherein the photographer can quickly and accurately adjust a manual setting of the information values desired by the photographer to automatically set information values or to information values in the proximity of the automatically set information values.

Additional objects and advantages of the invention will be set forth in part in the description which follows, and, in part, will be obvious from the description, or may be learned by practice of the invention.

The foregoing objects of the present invention are achieved by a camera with a camera information setting apparatus that includes a detection unit which detects the external information used during picture taking, an automatic setting unit which automatically sets information related to picture taking based on the aforementioned external information (for example, a CPU), and a manual setting unit which can be externally controlled by a photographer and which sets information, related to picture taking, through manual control. The camera information setting apparatus has a comparator which compares the information set by the automatic setting unit and the information set by the manual setting unit and a modification unit which modifies the variation in information settings with respect to the control input to the manual setting unit based on the results of the comparison by the comparator.

The detection unit of the camera information setting apparatus detects a particular type of information, such as the brightness of the subject to be photographed. This brightness information may be used to adjust the shutter speed, the aperture value or the exposure value, and the automatic setting unit determines the optimum setting for the shutter speed, the aperture value or the exposure value.

The detection unit may instead detect film information, such as the film speed, and the automatic setting unit sets the film speed based on the film information detected by the detection unit. Also, the detection unit may instead be used to detect information related to the distance of the camera from the subject, the information related to picture taking is the defocus amount (extent to which the subject is not in focus) or the distance to the subject, and the automatic setting unit sets the defocus amount or the distance based on the results from the detection unit.

A display shows at least one of the following: the information set by the automatic setting unit and the manual setting unit or the information obtained by comparing the information set by the automatic setting unit and the information set by the manual setting unit.

With the camera information setting apparatus for the camera of the present invention, the variation in information settings with respect to each incremental adjustment of the manual setting unit is modified according to the results of the comparison of the information set by the automatic setting unit and the information set by the manual setting unit during information setting.

If the detection unit is used to detect the brightness of the subject, the variation in the shutter speed, the aperture value or the exposure setting with respect each incremental adjustment of the manual setting unit is modified according to the results of the comparison of the shutter speed, aperture value or exposure value, respectively, set by the automatic setting unit and the current value of the shutter speed, aperture value or exposure value set by the manual setting unit during information setting. If the detection unit detects the film information, the variation in the film speed with respect to each incremental adjustment of the manual setting unit is modified according to the results of the comparison of the film speed set by the automatic setting unit and the current setting of the film speed set by the manual setting unit during information setting. And if the detection unit detects the distance to the subject, the variation in the defocus amount or the distance to the subject with respect to each incremental adjustment of the manual setting unit is modified according to the results of the comparison of the defocus amount or the distance to the subject set by the automatic setting unit and the current setting of the defocus amount or the distance to the subject set by the manual setting unit during information setting.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

The present invention is described with reference to the drawings which were briefly described above and which are now referred to in order to provide a detailed description of the preferred embodiments.

Figure 1:
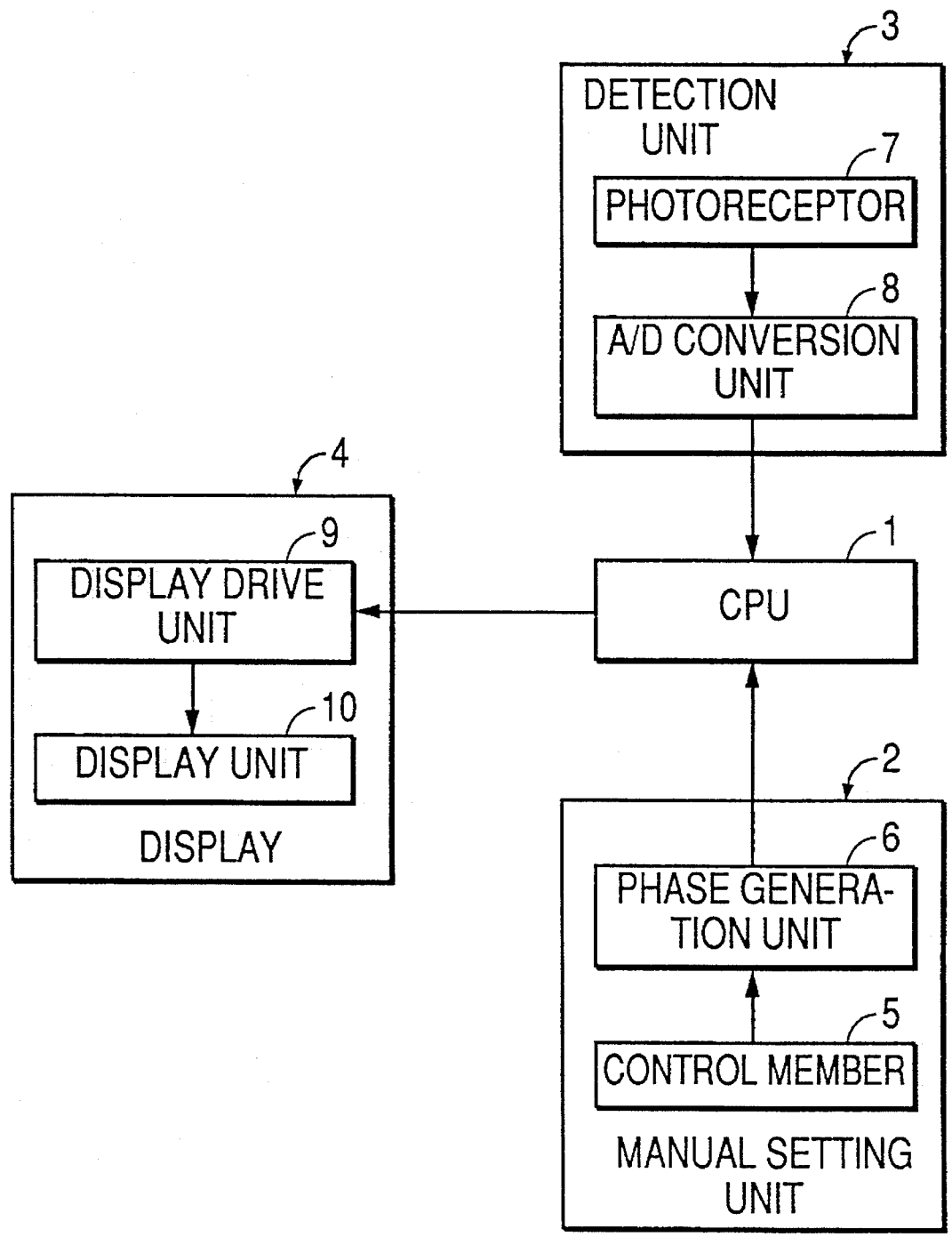
FIG. 1 is a block diagram of a camera according to an embodiment of the present invention.

FIG. 1 is a block diagram which shows an embodiment of a camera having an information setting apparatus according to the present invention. In this instance, the information setting apparatus is applied to a manual exposure adjustment unit of the camera. A CPU 1 comprises a microcomputer which performs overall control of the camera, a ROM which stores the camera control program, and a RAM which stores the various information. A manual setting unit 2, a detection unit 3 and a display unit 4 are connected to the CPU 1.

The manual setting unit 2 sets the exposure value through manual control, and in this embodiment, it comprises a control member 5 which can be externally controlled and a phase generation unit 6 (a signal generator) which generates at least two signals having different phases through operation of the control member 5.

The detection unit 3 detects the brightness of the subject, and comprises a photoreceptor element 7 and an A/D conversion unit 8. The display 4 displays the exposure value set by the CPU 1 and the manual setting unit 2, and comprises a display drive unit 9 and a display unit 10.

Figure 2:
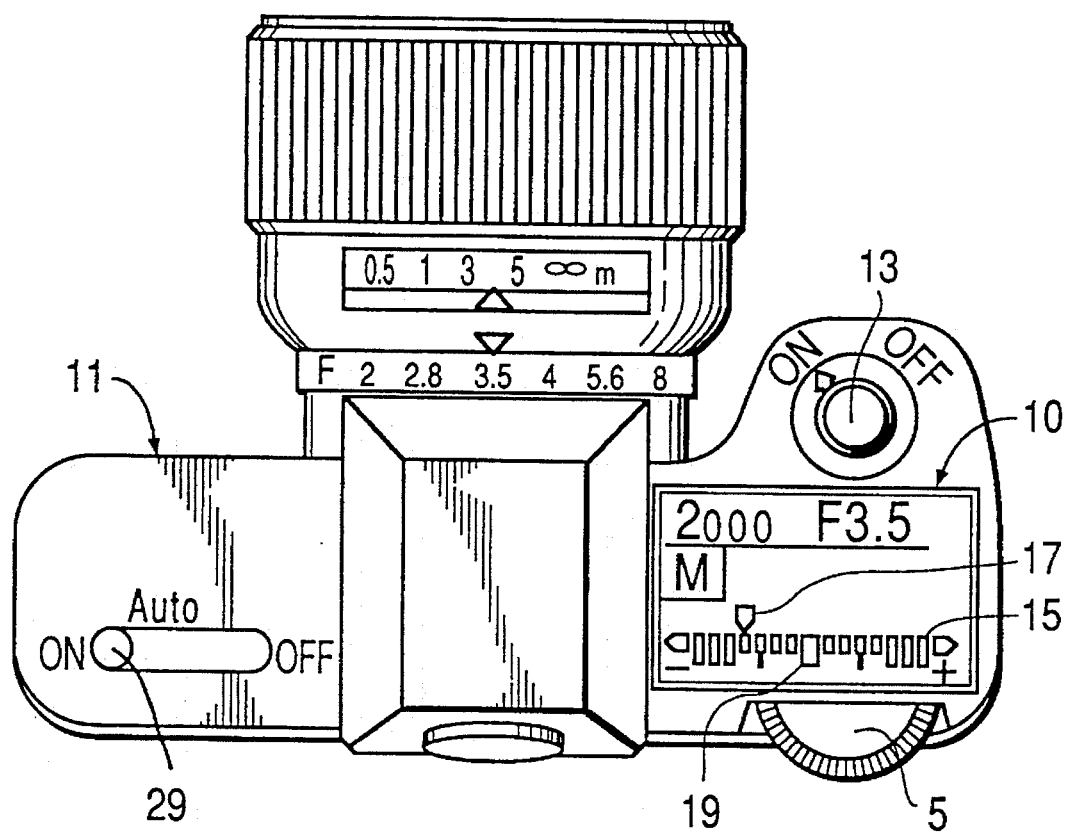
FIG. 2 is a top view of a camera employing the information setting apparatus of FIG. 1.

FIG. 2 is a top view of a camera in which the information setting apparatus of FIG. 1 is arranged. A release button 13 is positioned on the top of a camera body 11, and photometry by the detection unit 3 (FIG. 1) is started when the release button 13 is depressed halfway, and when the release button 13 is depressed fully, a series of release operations are performed.

Display unit 10, which displays photographic information such as the shutter speed, the aperture value and the exposure display, and control member 5 comprising a shutter speed setting dial are positioned behind the release button 13 on the top of the camera body 11. In the display unit 10, the exposure display is performed by using a scale 15 and an indicator 17, and through an optimum exposure position index 19 of the scale 15, the optimum exposure value position, detected by the detection unit 3 and computed by the CPU 1, is indicated.

Moreover, through the indicator 17, the present set exposure value position, which is set by the manual setting unit 2, is displayed. Therefore, the discrepancy between the optimum exposure position index 19 and the indicator 17 expresses the difference between the optimum exposure value determined by the CPU 1 and the presently set exposure value, and the photographer can manually set the exposure value to the optimum value or to a value in the vicinity of the optimum value by controlling the control member 5 so that the indicator 17 matches or moves close to the optimum exposure position index 19 of the scale 15.

In this embodiment, commonly known technology, such as that presented in Japanese Patent Publication No. 58-63923 and Japanese Patent Publication No. 60-118825, is used in the manual setting unit 2 which comprises the control member 5 and the phase generation unit 6.

Figure 3:
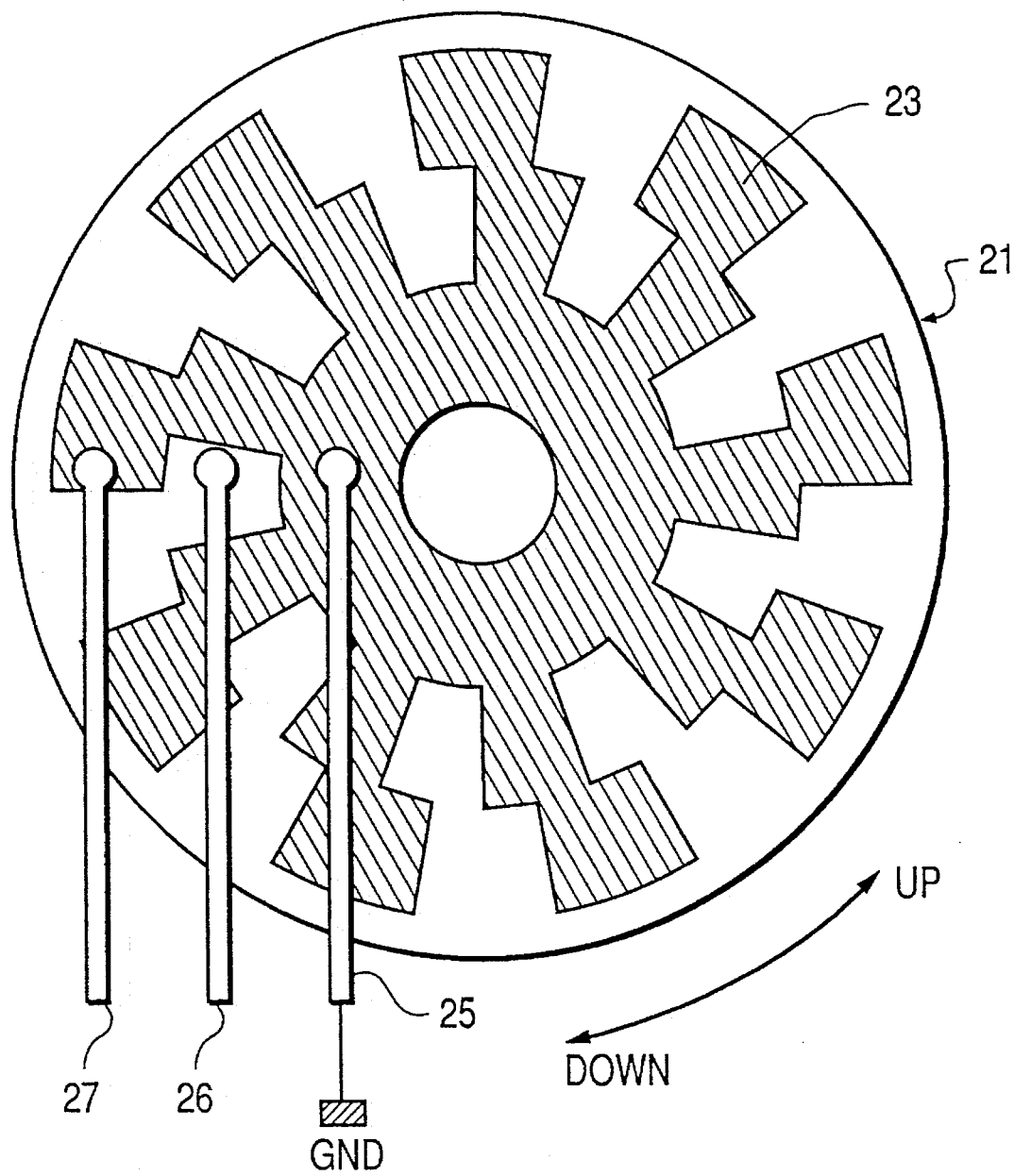
FIG. 3 is a schematic, top view showing the phase generation unit connected to the control member of FIG. 2.

FIG. 3 shows the phase generation section of the phase generation unit 6 which is positioned below the control member 5 in order to detect the rotation direction, and a rotation member 21 rotates in connection with the control member 5. A pattern 23 is formed on the rotation member 21 by a conductor, and three contacts 25, 26 and 27, are connected to this pattern 23. Here, contact 25 is a ground (GND) contact. Contacts 26 and 27 are independent, and they become a switch which forms a separate circuit by their becoming continuous with contact 25. Through the continuity of contact 27 with contact 25, as shown in FIGS. 4 and 5, circuit close signal A-ON is generated, and through the continuity of contact 26 and contact 25, circuit close signal B-ON is generated.

Figure 4:
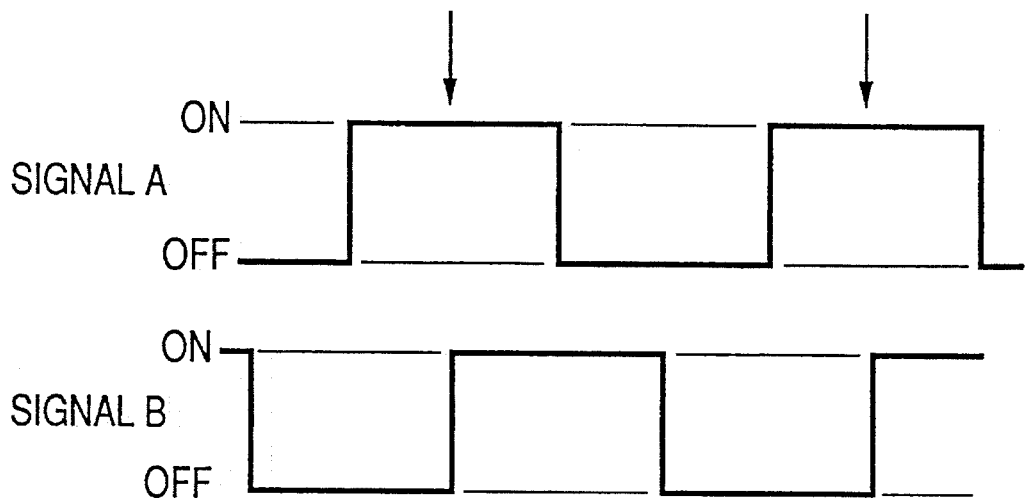
FIG. 4 is an explanatory diagram which shows the output condition of the addition signal from the phase generation unit of FIG. 3.

That is, in FIG. 3, when the rotation member 21 is rotated in the up direction, as shown in FIG. 4, signals A and B are generated in pulse form, but in the click positions shown by the arrows in FIG. 4, an addition signal is output if signal B is in the ON condition when signal A changes from ON to OFF.

Figure 5:
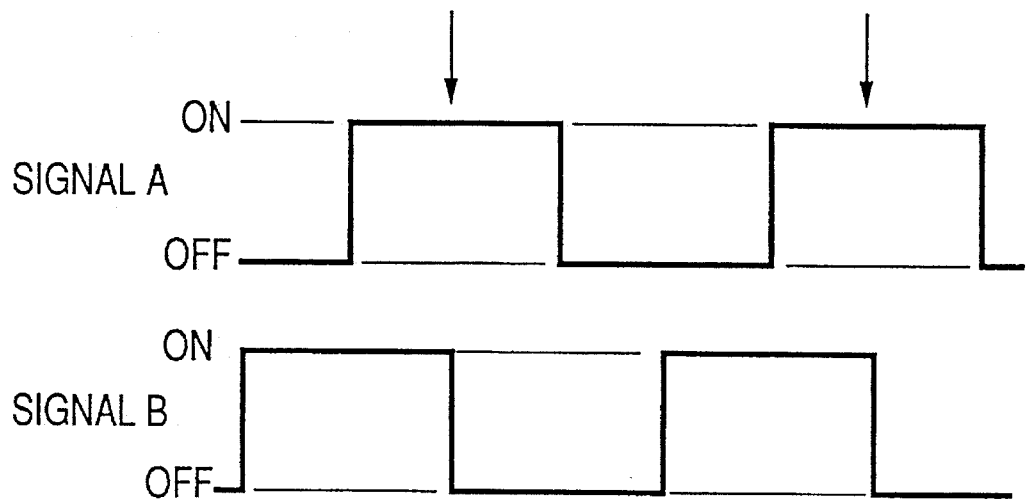
FIG. 5 is an explanatory diagram which shows the output condition of the subtraction signal from the phase generation unit of FIG. 3.

On the other hand, in FIG. 3, when the rotation member 21 is rotated in the down direction, as shown in FIG. 5, signals A and B are generated in pulse form, but in the click positions shown by the arrows in FIG. 5, a subtraction signal is output if signal B is in the OFF condition when signal A changes from ON to OFF.

Therefore, by rotating the control member 5 of the manual setting unit 2 to the left and to the right, the information value can be increased or decreased with respect to the presently set value.

In FIG. 2, a mode switch 29, which is for selecting the modification mode for automatically modifying the incremental change of the variation in the information value with respect to each incremental adjustment of the control member 5 during information setting, is positioned on the side opposite the display unit 10 of the camera body 11, and the modification mode can be selected by operating this mode switch 29 toward the ON setting.

Figure 6:
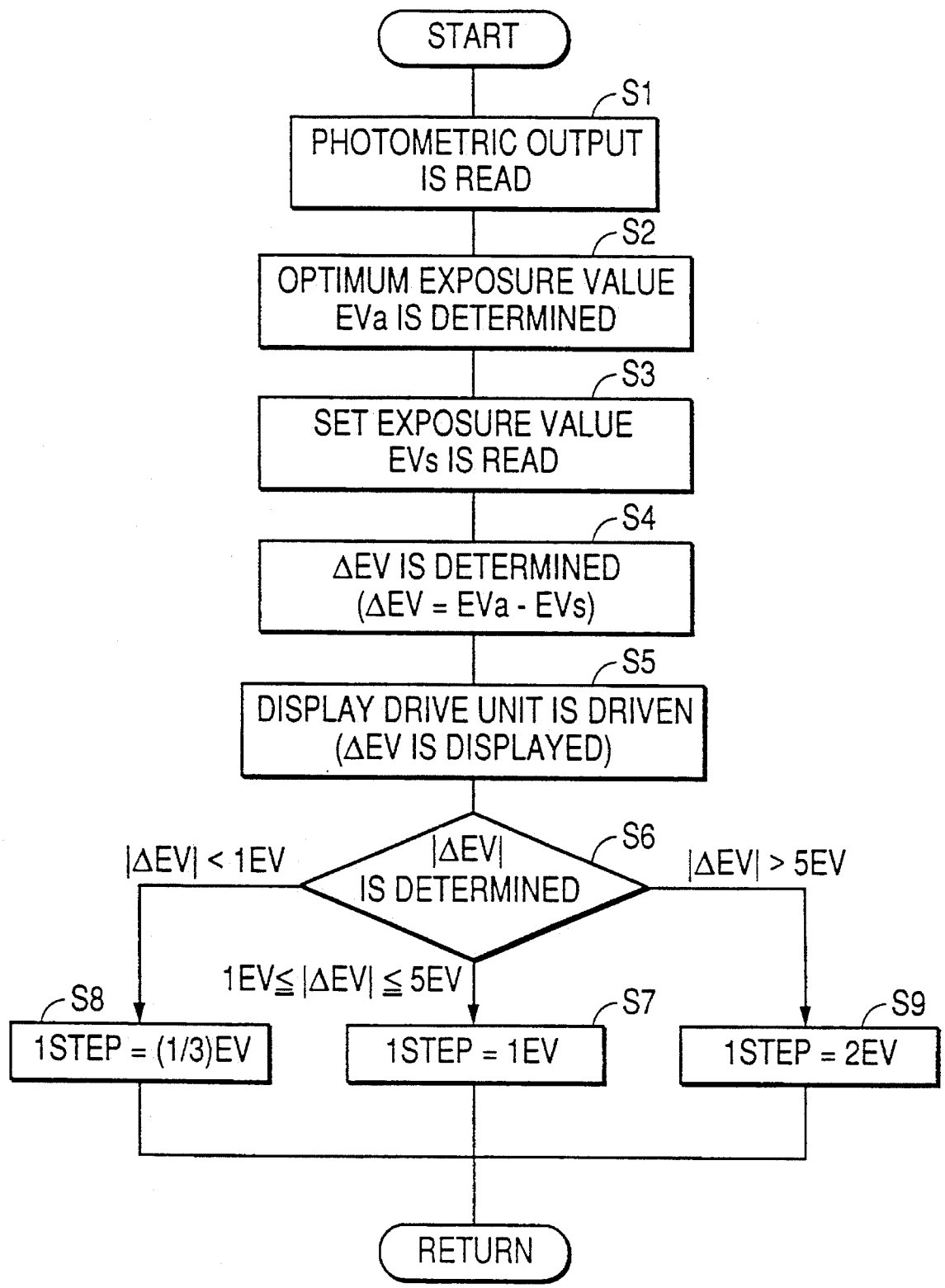
FIG. 6 is a flow chart which shows the operation of the information setting apparatus for the camera of FIG. 1.

FIG. 6 is a flow chart which shows the operation of setting the exposure value through the camera information setting apparatus. This flow chart starts by the camera power being turned ON, the mode switch 29 being turned ON, and the pressing down of the release button 13 halfway and, as a result, photometry by the detection unit 3 begins, the detected photometric information being output from the detection unit 3 and read into the CPU 1 (step S1). Next, the CPU 1 computes the optimum exposure value EVa according to the read-in photometric information (step S2). Then, the CPU 1 reads the presently set exposure value EVs from the manual setting unit 2 (step S3).

Next, the CPU 1 computes the difference ΔEV between the optimum exposure value EVa and the set exposure value EVs (step S4). After this, the CPU 1 drives the display drive unit 9 of the display 4 and displays ΔEV on the display unit 10 (step S5). Next, the CPU 1 determines the size of the absolute value |ΔEV| of ΔEV (step S6). Then, step S8 is proceeded to when |ΔEV|<1EV, step S7 is proceeded to when 1EV≦|ΔEV|≦5EV, and step S9 is proceeded to when |ΔEV|>5EV, wherein 1EV is a standard predetermined value.

That is, in step S6, when |ΔEV|<1EV, fine exposure adjustment is necessary, since the present set exposure amount EVs is very close to the optimum exposure value EVa determined by the CPU 1. Therefore, in this case, the shutter speed added or subtracted by one click of the control member 5, indicated by the arrows in FIGS. 4 and 5, is considered to be (⅓) EV (step S8).

Also, in step S6, when |ΔEV|>5EV, it is determined that exposure adjustment requires a large information setting variation, since the present set exposure amount EVs is extremely far from the optimum exposure value EVa determined by the CPU 1. Therefore, in this case, the shutter speed added or subtracted by the one click indicated by the arrows in FIGS. 4 and 5 is considered to be 2EV (step S9).

Moreover, in step S6, when 1EV≦|ΔEV|≦5EV, normal exposure adjustment is sufficient, since the present set exposure amount EVs is not very far from or very close to the optimum exposure value EVa determined by the CPU 1. Therefore, in this case, the shutter speed added or subtracted by the one click indicated by the arrows in FIGS. 4 and 5 is considered to be 1EV (step S7).

However, in the camera information setting apparatus with the above configuration, the optimum exposure EVa, which is automatically set by the CPU 1, and the set exposure value EVs, which is set by the manual setting unit 2, are compared, and because the variation in the information set with respect to the control input to the manual setting unit 2 is modified based on the results of this comparison, the photographer can quickly and accurately manually set the exposure value he or she needs to the automatically set optimum exposure value EVa or to an exposure value in that vicinity.

Also, in the camera information setting apparatus, in addition to optimum exposure position index 19, which displays the automatically set optimum exposure value EVa, an indicator 17, which displays the position of the present set exposure value EVs with respect to the scale 15, has been placed on the scale 15 of the display unit 10, so that by performing the setting of the exposure while watching this display unit 10, the photographer can more quickly and accurately manually set the exposure value he or she needs to the automatically set optimum exposure value EVa or to an exposure value in that vicinity.

In this embodiment, the present invention is explained using examples applicable to setting the shutter speed during manual exposure adjustment of the camera, but the present invention is not limited to such an embodiment. For example, the present invention can also be applied to an aperture value setting during manual exposure adjustment of the camera.

Moreover, it is clear that this embodiment can be modified such that the camera can perceive the manually set ISO speed in a film from which the ISO speed information can be read with the detection unit by detecting the film information from a DX contact. Also, in another modification, the detection unit can determine distance to the subject, to perceive the defocus amount, thereby making it possible to apply the present invention to so-called power focus photography, in which the photographer manually adjusts the focus, and it is also clear that the distance measurement operation of the camera in this case can be either active or passive.

Also, in the above-described embodiment, the control member 5 is a dial system type, but the present invention is not limited to such an embodiment, and it is, of course, conceivable to use another type of control member 5, such as a 2-button system.

As mentioned above, through the present invention, information set by an automatic setting unit and information set by a manual setting unit are compared, and because the variation in the information set with respect to the control input to the manual setting unit is modified based on the results of this comparison, there is an advantage in that the photographer can quickly and accurately manually set the information value he or she needs to the automatically set information value or to an information value in that vicinity.

Although a few preferred embodiments of the present invention have been shown and described, it would be appreciated by those skilled in the art that changes may be made in those embodiments without departing from the principles and spirit of the invention, the scope of which is defined in the claims and their equivalents.

What is claimed is:

1. A camera operated by a user for photographing a subject based upon a camera setting, the camera comprising:

a detection unit that detects information to be used during the photographing;

an automatic setting unit that receives the information from the detecting unit and determines an optimum setting for the camera based on the information;

a manual setting unit having a control member manually operable by the user, each incremental motion of the control member by the user causing a variation in a value of the camera setting;

a comparator that compares the optimum setting with the camera setting, to generate a comparison result; and a modification unit that modifies an amount of the variation based upon the comparison result.

2. The camera as claimed in claim 1, wherein:

said detection unit detects a brightness of the subject;

the optimum setting determined by said automatic setting unit being an optimum value for one of shutter speed, aperture value and exposure value; and the camera setting adjusting the one of the shutter speed, aperture value and exposure value for which the optimum value is determined by said automatic setting unit.

3. The camera as claimed in claim 1, wherein:

said detection unit detects film information from film, loaded in the camera, relating to film speed;

the optimum setting determined by said automatic setting unit being the film speed; and the camera setting adjusting the film speed.

4. The camera as claimed in claim 1, wherein:

said detection unit detects a distance from the camera to the subject;

the optimum setting determined by said automatic setting unit being an optimum value for focusing the camera; and the camera setting adjusting the focus of the camera.

5. The camera as claimed in claim 1, further comprising:

a display unit that displays one of the comparison result of the comparator, and the optimum setting and the camera setting.

6. A camera operated by a user for photographing a subject based upon a camera setting, said camera comprising:

an automatic setting unit that detects information to be used during the photographing and determines an optimum setting for the camera based on the information;

a manual setting unit being manually adjustable by the user, each incremental motion of the manual setting unit by the user causing a variation in a value of the camera setting; and a modification unit comparing the optimum setting with the camera setting, to generate a comparison result, and modifying an amount of the variation based upon said comparison result.

7. The camera as claimed in claim 6, wherein said manual setting unit comprises:

a control member which is manually rotated in increments about an axis in a first and second direction; and a signal generator which is rotated according to the manual rotation of said control member and, as a result, generating first and second phase signals differing in phase from each other, to adjust the value of the camera setting.

8. The camera as claimed in claim 6, wherein the variation is a first amount if a difference between the optimum setting and the camera setting is less than a first threshold value, the variation is a second amount greater than the first amount if the difference is at least as great as the first threshold value and less than a second threshold value greater than the first threshold value and the variation is a third amount greater than the second amount if the difference is at least as great as the second threshold value.

* * * * *